(12) United States Patent
Eise (10) Patent No.: US 10,309,540 B2
(45) Date of Patent: Jun. 4, 2019

(54) VALVES FOR CONTROLLING FLUID PASSAGE

(71) Applicant: John M. Eise, O'Fallon, MO (US)

(72) Inventor: John M. Eise, O'Fallon, MO (US)

( * ) Notice: Subject to any disclaimer, the term of this patent is extended or adjusted under 35 U.S.C. 154(b) by 123 days.

(21) Appl. No.: 15/284,237

(22) Filed: Oct. 3, 2016

(65) Prior Publication Data

US 2018/0094732 A1    Apr. 5, 2018

(51) Int. Cl.
    *F16L 29/00*      (2006.01)
    *F16K 3/26*      (2006.01)

(52) U.S. Cl.
    CPC ............... *F16K 3/26* (2013.01); *F16L 29/00* (2013.01)

(58) Field of Classification Search
    CPC .. F16K 3/26; F16K 3/267; F16K 3/265; F16L 29/00; F16L 39/005; F16L 29/02; F16L 29/002; Y10T 137/86638; Y10T 29/49432; B04B 11/06
    USPC .......................................... 251/149.2, 149.8
    See application file for complete search history.

(56) References Cited

U.S. PATENT DOCUMENTS

| | | | | | |
|---|---|---|---|---|---|
| 1,579,567 | A | * | 4/1926 | Schriner | F16K 3/26 251/215 |
| 2,529,544 | A | * | 11/1950 | Ebert | F16K 5/162 251/162 |
| 4,066,241 | A | * | 1/1978 | Read | E21B 34/12 251/361 |
| 4,591,074 | A | * | 5/1986 | Kennings | B65D 55/02 222/153.01 |
| 4,805,675 | A | * | 2/1989 | Joseph | B01J 4/001 137/625.17 |
| 5,275,195 | A | * | 1/1994 | Breda | F16K 11/078 137/100 |
| 5,582,742 | A | | 12/1996 | Wilkie et al. | |
| 5,819,798 | A | * | 10/1998 | Claflin | B41J 2/17 137/625.11 |

(Continued)

FOREIGN PATENT DOCUMENTS

| | | |
|---|---|---|
| CN | 102635749 A | 8/2012 |
| CN | 204592498 U | 8/2015 |

(Continued)

OTHER PUBLICATIONS

International Search Report and Written Opinion issued in PCT/US2017/054948 dated Jan. 2, 2018, 15 pages.

*Primary Examiner* — Angelisa L. Hicks
(74) *Attorney, Agent, or Firm* — Harness, Dickey & Pierce, P.L.C.

(57) ABSTRACT

A valve includes a housing, a pipe and a fastener configured to couple to the housing and the pipe. The housing defines an aperture, and includes an inlet configured to receive fluid from a fluid source. The pipe defines a channel and an aperture in fluid communication with the pipe channel, and includes an outlet configured to couple to an output for receiving fluid from the fluid source. The pipe is rotatable within the housing between a first position in which the housing aperture is blocked by the pipe to restrict fluid from entering the pipe channel, and a second position in which the pipe aperture is substantially aligned with the housing aperture to create a fluid path between the fluid source and the output via the pipe channel. Other example valves and methods of controlling the passage of fluid are also disclosed.

20 Claims, 4 Drawing Sheets

(56) References Cited

U.S. PATENT DOCUMENTS

| | | | |
|---|---|---|---|
| 6,687,936 B2* | 2/2004 | Graebe | A47C 27/081 |
| | | | 137/625.48 |
| 7,059,349 B2* | 6/2006 | Breda | E03C 1/023 |
| | | | 137/625.11 |
| 7,469,880 B2 | 12/2008 | Green et al. | |
| 7,520,298 B2* | 4/2009 | George | F16K 11/0856 |
| | | | 134/21 |
| 2004/0148694 A1 | 8/2004 | Brennan et al. | |
| 2005/0281693 A1 | 12/2005 | Roberts | |
| 2009/0145503 A1 | 6/2009 | Green et al. | |
| 2011/0244995 A1 | 10/2011 | Chen | |

FOREIGN PATENT DOCUMENTS

| | | |
|---|---|---|
| CN | 204728397 U | 10/2015 |
| CN | 105435524 A | 3/2016 |
| WO | WO-2006055945 A2 | 5/2006 |

\* cited by examiner

VALVES FOR CONTROLLING FLUID PASSAGE

FIELD

The present disclosure generally relates to valves for controlling fluid passage, and more particularly to valves having, for example, rotatable components for controlling fluid passage.

BACKGROUND

This section provides background information related to the present disclosure which is not necessarily prior art.

Pipes are installed in a house, an apartment, office buildings, etc. during a rough-in stage of a construction project. The pipes can then be pressurized and filled with fluid such as water, gas, etc. Sometimes, caps can be attached (e.g., soldered, etc.) to open ends of the installed pipes to prevent fluid from exiting the pipes. If a user wants to install a fluid output (e.g., a toilet, a faucet, etc.) to one of the installed pipes, the user depressurizes and drains the fluid from all of the installed pipes. After the installed pipes are depressurized and drained, the user can cut the cap off the desired pipe and install the fluid output.

SUMMARY

This section provides a general summary of the disclosure, and is not a comprehensive disclosure of its full scope or all of its features.

According to one aspect of the present disclosure, a valve assembly for controlling the passage of fluid between a fluid source and an output includes a housing, a pipe insertable in the housing and a fastener configured to couple to the housing and the pipe. The housing defines a channel and an aperture, and includes an inlet configured to receive fluid from a fluid source via the aperture. The pipe defines a channel and an aperture in fluid communication with the channel of the pipe, and includes an outlet configured to couple to an output for receiving fluid from the source via the channel of the pipe and the channel of the housing. The pipe is rotatable within the housing between a first position in which the aperture of the housing is blocked by the pipe to restrict fluid from entering the channel of the pipe, and a second position in which the aperture of the pipe is substantially aligned with the aperture of the housing to create a fluid path between the fluid source and the output via the channel of the pipe. The fastener is configured to allow rotation of the pipe between the first position and the second position.

According to another aspect of the present disclosure, a method of controlling the passage of fluid between a fluid source and an output with a valve is disclosed. The valve includes a housing and a pipe insertable in the housing. The housing defines a channel and an aperture, and the pipe defines a channel and an aperture. The method includes rotating the pipe within the housing between a first position in which the aperture of the housing is blocked by the pipe to restrict fluid from entering the channel of the pipe, and a second position in which the aperture of the pipe is substantially aligned with the aperture of the housing to create a fluid path between the fluid source and the output via the channel of the housing and the channel of the pipe.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
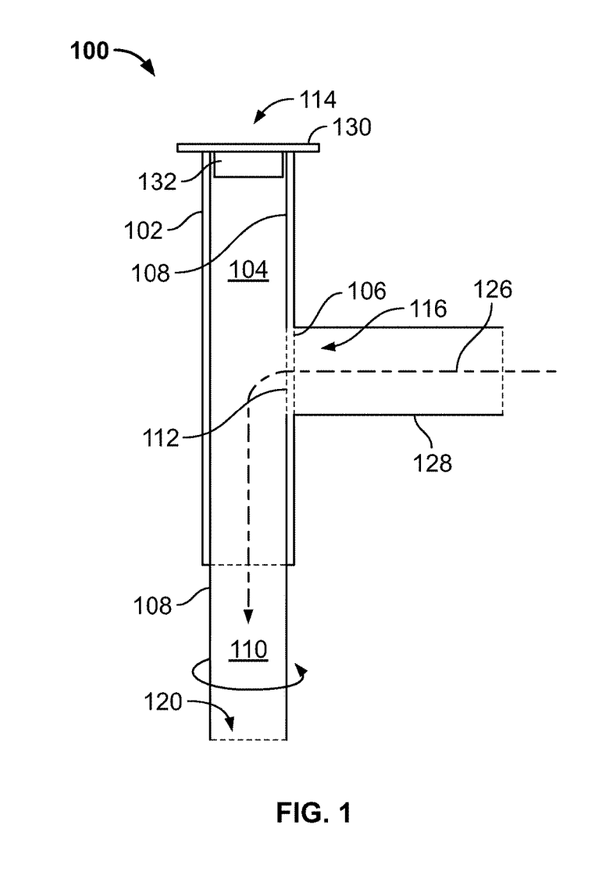
FIG. 1 is a block diagram of a valve including a housing, a fastener, and a pipe inserted into the housing and rotated to form a fluid path through the valve according to one example embodiment of the present disclosure.
Figure 2:
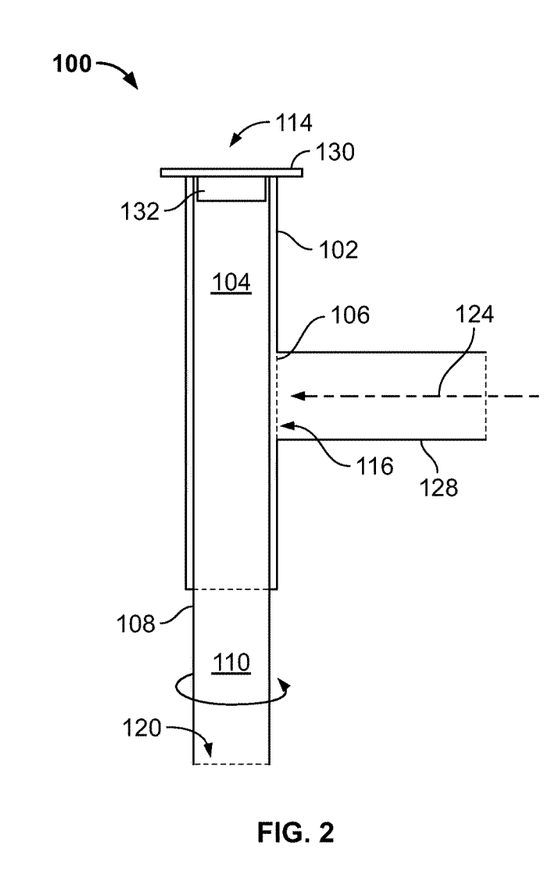
FIG. 2 is the value of FIG. 1, where the pipe is rotated to block the fluid path through the valve according to another example embodiment.

A valve for controlling the passage of fluid between a fluid source and an output according to one example embodiment of the present disclosure is illustrated in FIGS. 1 and 2, and indicated generally by reference number 100. As shown in FIGS. 1 and 2, the valve 100 includes a housing 102 defining a channel 104 and an aperture 106, a pipe 108 inserted in the housing 102 and defining a channel 110 and an aperture 112 in fluid communication with the channel 110, and a fastener 114 coupled to the housing 102 and the pipe 108. The housing 102 includes an inlet 116 to receive fluid from a fluid source (not shown) via the housing aperture 106, and the pipe 108 includes an outlet 120 coupled to an output (not shown) for receiving fluid from the source via the pipe channel 110 and the housing channel 104.

The pipe 108 is rotatable within the housing 102 between one position in which the housing aperture 106 is blocked by the pipe 108 to restrict fluid from entering the pipe channel 110, and another position in which the pipe aperture 112 is substantially aligned with the housing aperture 106 to create a fluid path between the fluid source and the output via the pipe channel 110. For example, FIG. 2 illustrates the pipe 108 in a position in which the housing aperture 106 is blocked by the pipe 108 causing a restricted fluid path, as shown by the arrow 124. FIG. 1 illustrates the pipe 108 in another position in which the pipe aperture 112 is substantially aligned with the housing aperture 106 to form the fluid path, as shown by the arrow 126.

By rotating the pipe 108 inside the housing 102 to block fluid from flowing to the output via the pipe 108, a user can work on the output side of the outlet 120 without depressurizing and draining fluid from the source side of a system including the valve 100 and/or any other valve disclosed herein. For example, a user can install, repair, replace, etc. control valves and/or other connections (e.g., joints, pipes, etc.) at the output, on pipes between the output and the outlet 120, etc. without depressurizing and draining fluid from the source side. As such, construction project(s) utilizing the valve 100 and/or any other valve disclosed herein may be completed faster than conventional techniques which require depressurizing and draining of fluid in the entire piping system, installing (e.g., soldering, etc.) caps to the pipes and/or removing caps attached (e.g., soldered, etc.) to pipes, etc.

Additionally, because depressurizing and draining fluid in the piping system is not required, leaks from residual fluid remaining in the pipes after such draining may be eliminated. This may reduce the chance of damaging finished work such as flooring, drywall, etc. when working on the output side of the outlet 120.

In some cases, pressurization of the source side (e.g., on the input side of the inlet 116) can occur sooner than when using conventional techniques. For example, pressurization can occur during the rough-in stage of a construction project. This may allow a user to locate leaks and/or possible locations of future leaks on the source side pipes to leak, to work on (e.g., repair, replace, etc.) source side pipes, etc. prior to when the finishing work is started and/or completed. As such, possible damage to finished work may be reduced due to faulty source side pipes.

As shown in FIGS. 1 and 2, the housing channel 104 extends the entire length of the housing 102. In other embodiments, the housing channel 104 may extend a distance less than the entire length of the housing 102. For example, the housing may include a solid endplate, an endplate with one or more opening(s), etc. In such examples, the housing channel 104 may extend from the endplate, etc. to the other end of the housing 102.

The housing aperture 106 is positioned in the side of the housing 102. For example, the housing 102 includes a casing having an interior surface and an exterior surface. The housing aperture 106 extends between the interior surface and the exterior surface such that fluid from the fluid source can flow through the housing aperture 106 and into the pipe channel 110 if the pipe 108 is rotated appropriately.

In the example of FIGS. 1 and 2, the housing 102 is coupled to the fluid source via a pipe 128. For example, the pipe 128 may be coupled (e.g., welded, etc.) at one end to the housing 102 adjacent the housing aperture 106, and coupled at another end to the fluid source, another pipe, etc. As such, fluid can flow from the fluid source into the housing 102 via the pipe 128 and the housing aperture 106. In some embodiments, the pipe 128 may be considered the fluid source (or at least a portion of the fluid source). In other embodiments, the pipe 128 may be considered a portion of the housing 102. In such cases, the housing channel 104 may extend into the pipe 128.

The pipe 108 is inserted in the housing 102 such that the pipe 108 is rotatable within the housing channel 104. For example, the pipe 108 may be sized relative to the housing 102 to allow rotation of the pipe 108. In some examples, an exterior perimeter of the pipe 108 may be slightly smaller than an interior perimeter of the housing 102 to ensure the pipe 108 can rotate without excessive space between the pipe 108 and the housing 102. In such examples, the pipe 108 can still restrict (e.g. substantially block, etc.) the fluid path, as shown by the arrow 124 in FIG. 2.

In some embodiments, the pipe 108 can be rotated when the housing 102 is coupled to the fluid source (e.g., via one or more pipes such as the pipe 128). In such examples, fluid may be present in at least a portion of the housing 104. For example, fluid may be present in the pipe 128 when the housing 102 is coupled to the fluid source. During this time, a user can rotate the pipe 108 and/or otherwise manipulate the pipe 108 (as explained herein) to allow fluid to flow through the valve 100 and/or to restrict fluid flow.

The fastener 114 allows rotation of the pipe 108 between positions. For example, the fastener 114 can allow the pipe to rotate in one direction (e.g., one way), or in two directions. In the particular example of FIGS. 1 and 2, the pipe 108 rotates towards the right. For example, when viewed from a top side of the valve 100 (e.g., from the fastener 114), the pipe 108 rotates in a counterclockwise direction. In other embodiments, the pipe 108 can additionally and/or alternatively rotate towards the left (e.g., clockwise direction when viewed from the top side) if desired.

When rotated, the pipe 108 can turn without limitation. For example, the pipe 108 can rotate more or less than one revolution (e.g., 360 degrees) without being stopped. In other examples, the pipe 108 may be restricted from rotating beyond a defined distance. For example, the pipe 108 may be restricted by one or more stops that correspond to the pipe positions (shown in FIGS. 1 and 2), as explained above. The stop(s) can restrict rotation of the pipe 108 to about 45 degrees, about 90 degrees, about 115 degrees, about 180 degrees, about 330 degrees, and/or another suitable rotational distance.

Similar to the housing channel 104, the pipe channel 110 may extend the entire length of the pipe 108 (e.g., end-to-end) or a distance less than the entire length of the pipe 108. Additionally, similar to the housing aperture 106, the pipe aperture 112 is positioned in the side of the pipe 108. For example, the pipe aperture 112 extends between an interior surface and an exterior surface of the pipe 108 such that fluid from the fluid source can flow through the aperture 112 and into the pipe channel 110 if the pipe 108 is rotated appropriately.

As explained above, the fastener 114 is coupled to both the pipe 108 and the housing 102. For example, and as shown in FIGS. 1 and 2, the fastener 114 includes a head 130 and a body 132 extending from the head 130. The body 132 of the fastener 114 is coupled to the pipe 108 and the head 130 of the fastener 114 is coupled to the housing 102. In such examples, a user can insert the body 132 into the pipe channel 110 to attach (e.g., via threads, friction, adhesive, etc.) the fastener 114 to the pipe 108. The head 130 can be forced against, rest on, etc. an edge surface of the housing 102. As such, the fastener 114 generally couples the pipe 108 and the housing 102 together. In so doing, the fastener 114 can restrict longitudinal (e.g., linear, etc.) movement, but not necessarily rotational movement, of the pipe 108.

In some embodiments, at least a portion of the fastener 114 (and in some cases the entire fastener 114) is detachable from the pipe 108 and the housing 102. In such examples, the fastener 114 can be considered a detachable fastener. For example, a user can remove the fastener 114 by unscrewing the fastener from the pipe 108, pulling the fastener out of the pipe 108, etc. This allows a user to remove the pipe 108 from the housing 102 if desired.

In some embodiments, the fastener (e.g., the fastener 114, etc.) may bias the pipe inside the housing in one of the positions explained herein. For example, FIGS. 3 and 4 illustrate a fluid system 300 including a fluid source 302, a valve 304, a pipe 306 coupled between the fluid source 302 and the valve 304, and an output 308 coupled to the valve 304.

Figure 3:
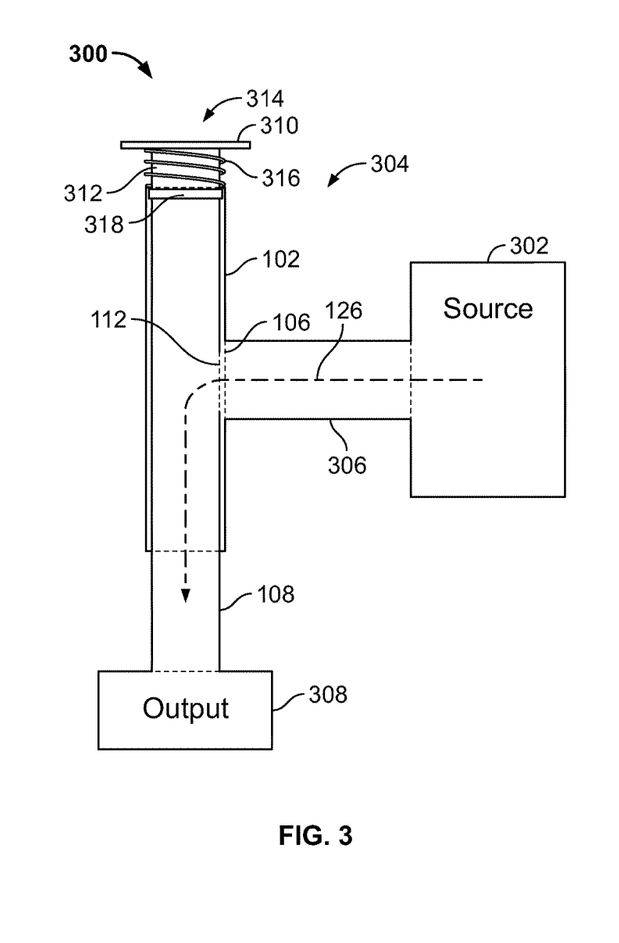
FIG. 3 is a block diagram of a valve including a housing, a pipe inserted into the housing, and a fastener including a spring in a steady state according to yet another example embodiment.
Figure 4:
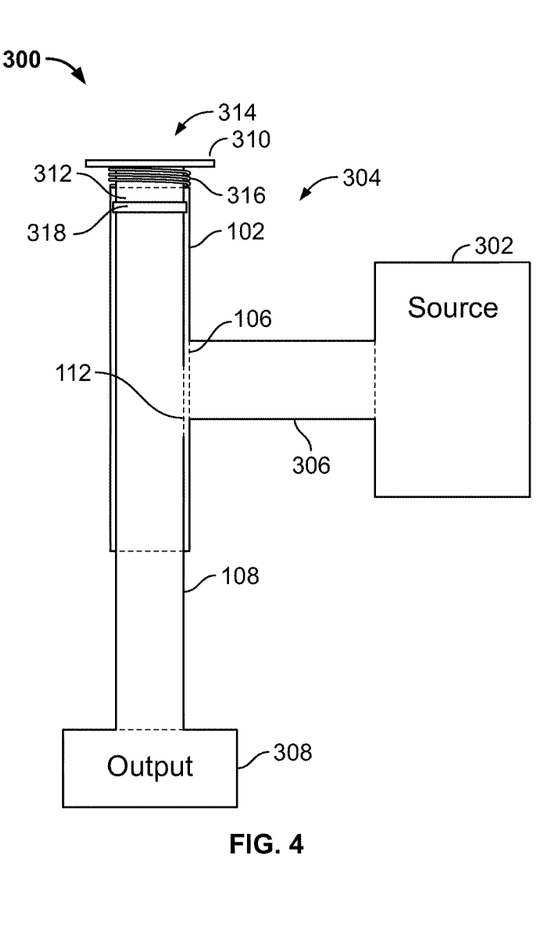
FIG. 4 is the value of FIG. 3, where the spring is compressed according to another example embodiment.

The valve 304 of FIGS. 3 and 4 is substantially similar to the valve 100 of FIGS. 1 and 2. For example, the valve 304 of FIGS. 3 and 4 includes the housing 102 and the pipe 108 inserted into and rotatable within the housing 102, as explained above. The valve 304, however, includes a fastener 314 that can bias the pipe 108 in a longitudinal direction inside the housing in one of the pipe's positions, as explained herein.

For example, and as shown in FIGS. 3 and 4, the fastener 314 includes a head 310, a body 312 extending from the head 310, a coupler 318 coupled to the body 312, and a spring 316 positioned about the body 312. As shown, the coupler 318 may be positioned within the housing 102 and coupled between an edge surface of the pipe 108 and an edge surface of the body 312 to couple the pipe 108 and the fastener 314 together. The coupler 318 may be a clamp, a nut that includes threads corresponding to threads on the pipe 108 and/or the body 312, etc.

For example, the housing 102 may include an endplate having an opening for receiving the body 312. The opening in the endplate may be sized to allow the body 312 to pass through the opening but not the coupler 318. As such, the coupler 318 may be forced against the endplate of the housing 102 due to the spring 316 when the fastener 314 is coupled to the housing 102 and the pipe 108.

As shown, the spring 316 is positioned between the head 310 of the fastener 314 and the housing 102 when the fastener 314 is coupled to the housing 102 and the pipe 108. This allows the spring 316 to bias the pipe 108 inside the housing 102 in one and/or both positions, as explained herein. For example, the spring 316 maintains the coupler 318, and therefore the pipe 108 coupled to the coupler 318, adjacent an edge surface of the housing 102 (e.g., the endplate, etc.) when the spring 316 is in its steady state (e.g., a substantially uncompressed state, etc.), as shown in FIG. 3. As such, the pipe 108 can be substantially restricted from linear and rotational movement within the housing 102 unless an outside force acts on the pipe 108.

In other embodiments, the coupler 318 of the fastener 314 may be attached (e.g., welded, adhered, mechanically attached, etc.) to an exterior side of the housing 102. In such examples, the body 312 of the fastener 314 may move into and out of the housing 102 via the coupler 318. The spring 316 can be positioned between the head 310 and the coupler 318, and bias the pipe 108 inside the housing 102.

A user can move at least a portion of the pipe 108 (e.g., in a longitudinal direction) out of the housing 102 against the bias of the fastener 314. In such examples, the user can move the pipe 108 by hand. For example, if the user pulls the pipe 108 away from the housing 102 and/or pushes the head 310 of the fastener 314 towards the housing 102, the spring 316 can compress between the head 310 and the housing 102 (e.g., the endplate of the housing 102, etc.), as shown in FIG. 4. In other examples, the spring 316 can compress between the head 310 and the coupler 318 if the coupler 318 is attached to the exterior side of the housing 102, as explained above.

In either case, the spring 316 can transition between its steady state (shown in FIG. 3) to a compressed state (shown in FIG. 4) so that the pipe 108 can be rotated between positions, as explained above. As such, a user can pull and rotate the pipe 108 (e.g. by hand, etc.) into one position so the pipe aperture 112 is substantially aligned with the housing aperture 106 to form the fluid path (as shown by arrow 126 in FIG. 3), and/or rotate the pipe 108 into another position so the housing aperture 106 is blocked by the pipe 108, as explained above. Therefore, the spring 316 can bias the pipe 108 inside the housing 102 in one and/or both positions, as explained herein.

Figure 5:
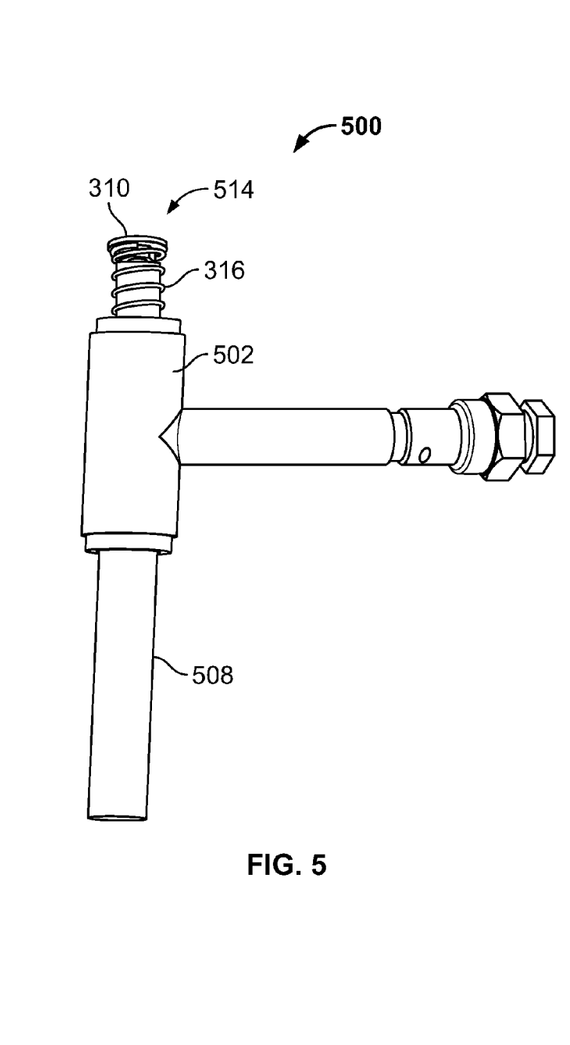
FIG. 5 is a front view of a valve including a housing, a fastener, and a pipe inserted into the housing according to yet another example embodiment.
Figure 6:
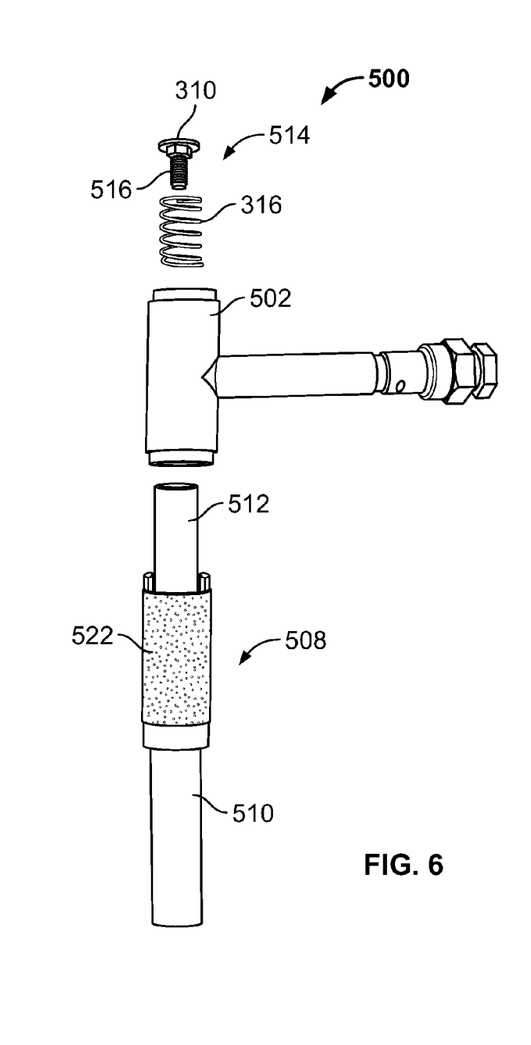
FIG. 6 is an exploded front view of the valve of FIG. 5.
Figure 7:
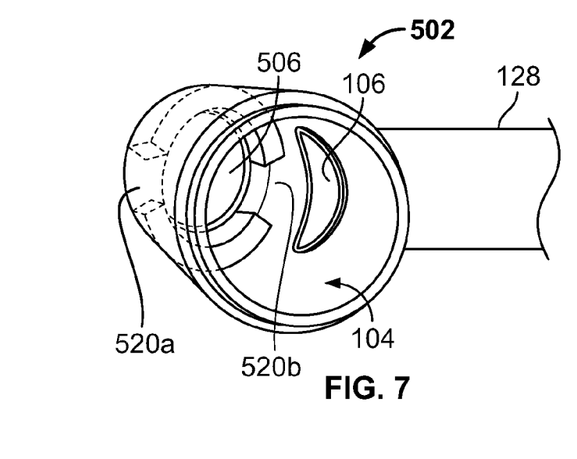
FIGS. 7 and 8 are a bottom perspective view and a top perspective view, respectively, of the housing of FIG. 5.
Figure 8:
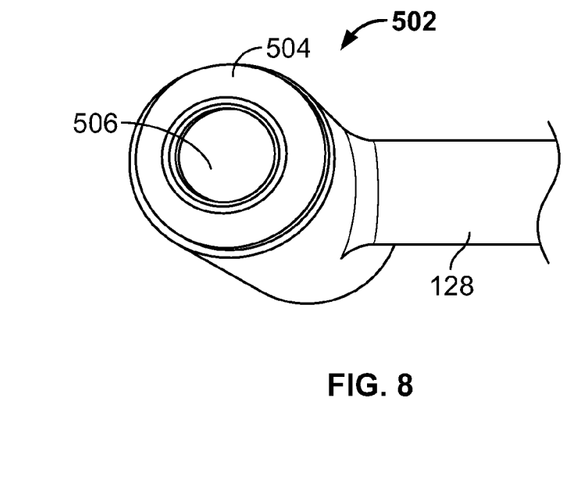
Figure 9:
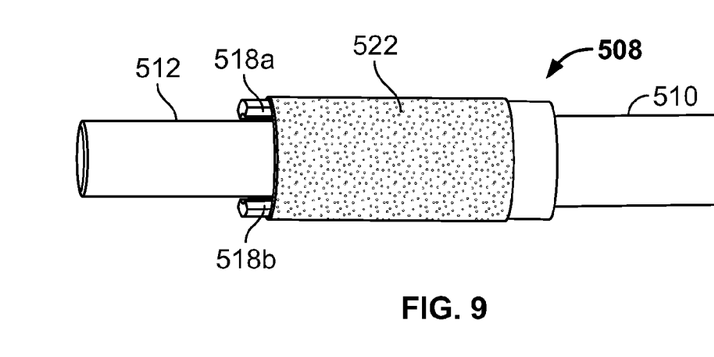
FIG. 9 is a side view of the pipe of FIG. 5.
Figure 10:
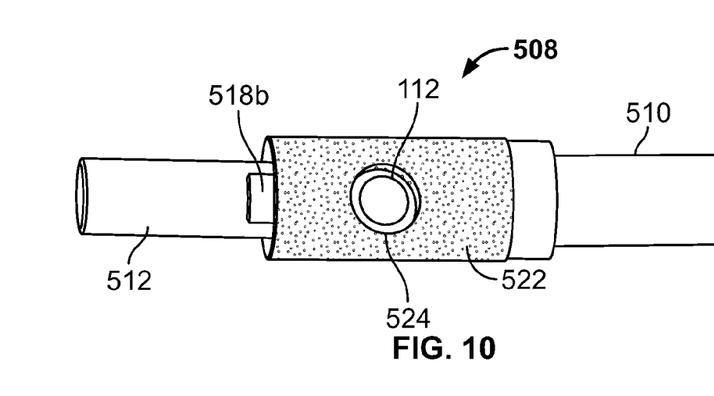
FIG. 10 is a side view of the pipe of FIG. 9, where the pipe is rotated.

FIGS. 5 and 6 illustrate another example valve 500 substantially similar to the valve 304. The valve 500 includes a housing 502 having the channel 104 and the aperture 106 of FIGS. 1 and 2, a pipe 508 having a channel (not shown) and the aperture 112 of FIGS. 1 and 2, and a fastener 514 coupled to the housing 502 and the pipe 508. FIGS. 7 and 8 illustrate the housing 502 including its channel 104 and aperture 106, and FIGS. 9 and 10 illustrate the pipe 508.

The housing 502 is similar to the housing 102 of FIGS. 1-4, but includes an endplate 504 adjacent one end of the housing 502. The endplate 504 defines an opening 506 for receiving a portion of the pipe 508, as further explained below. The endplate 504 can be a separate component coupled to the end of the housing 502, or monolithically formed with a casing of the housing 502.

Similar to the housing 102 of FIGS. 1 and 2, the housing 502 is coupled to the pipe 128. The pipe 128 can represent a fluid source (as explained herein), a pipe coupled between the housing 502 and a fluid source, etc.

The fastener 514 is similar to the fastener 314 of FIGS. 3 and 4, but includes threads. For example, the fastener 514 includes the head 310 of FIGS. 3 and 4, a body extending from the head 310, and the spring 316 of FIGS. 3 and 4 positioned about the body. The body includes threads 516 for attaching to the pipe 508, as further explained below.

The pipe 508 is similar to the pipe 108 of FIGS. 1-4, but includes a body portion 510 and a stud 512 extending from the body portion 510. As shown in FIG. 5, the stud 512 extends through the opening 506 of the endplate 504 when the pipe 508 is inserted into the housing 502. When the stud 512 extends through the opening 506 of the endplate 504, the body portion 510 of the pipe 508 is adjacent an interior facing side of the endplate 504. As such, the endplate 504 can function as a stop for the pipe 508.

In the example of FIGS. 5-10, the pipe 508 includes threads corresponding to the threads 516 of the fastener 514. Specifically, the stud 512 of the pipe 508 includes threads corresponding to the threads 516 of the fastener's body. As such, the fastener 514 may be attached (e.g., threadedly coupled) to the pipe 508 when the pipe 508 is inserted into the housing 502 (and through the opening 506 of the endplate 504). During this time, the spring 316 can bias the pipe 508 against the endplate 504 of the housing 502 to restrict linear movement of the pipe 508. Additionally and/or alternatively, the pipe 508 and the fastener 514 may be coupled together in another suitable manner, as explained herein.

As shown in FIGS. 7-10, the pipe 508 includes two protuberances 518 extending from an outer surface of the pipe 508 and the housing 502 includes two slots 520 defined in an inner surface of the housing 502. When the pipe 508 is inserted into the housing 502, the inner surface of the housing 502 is adjacent the outer surface of the pipe 508.

Additionally, the protuberances 518 substantially correspond to the slots 520 of the housing 502. For example, the slots 520 can be sized to receive the protuberances 518. As such, the slots 520 may be sized and shaped to receive the protuberances 518. This allows the protuberances 518 to rest in the slots 520 thereby restricting rotational movement of the pipe 508, if desired. In doing so, the alignment of the slots 520 and the protuberances 518 can retain the pipe 508 in one of the positions, as explained above.

In such examples, one slot location may represent one pipe position and the other slot location may represent the other position, as explained herein. For example, when the pipe 508 is inserted into the housing 502 and the fastener 514 is coupled to the pipe 508, a user may pull, push or otherwise manipulate the pipe 508 and/or the fastener 514 to compress the biasing spring 316, as explained above. In doing so, the pipe 508 can be moved in a longitudinal direction to insert the protuberances 518 into the slots 520 and/or release the protuberances 518 from the slots 520.

During this time, the user may rotate the pipe 508 (as explained above) to align the protuberances 518 with the slots 520. For example, one protuberance 518a may align with the slot 520a and the other protuberance 518b may align with the other slot 520b. This may represent one pipe position, as explained herein.

After rotating the pipe 508, the protuberance 518a may align with the other slot 520b and the protuberance 518b may align with the slot 520a. This may represent another pipe position, as explained herein. In other embodiments, the pipe 508 may be rotated such that the protuberances 518 do not align with the slots 520. In such cases, this also may represent another pipe position.

As shown in FIGS. 9 and 10, the protuberances 518 are spaced about 180 degrees apart. Likewise, the slots 520 are spaced about 180 degrees apart. For example, the protuberance 518a and the protuberance 518b extend from opposing sides of the pipe 508. As such, a user can rotate the pipe 508 about 180 degrees to move the pipe 508 in different positions, as explained above.

Although FIGS. 7-10 illustrate the pipe 508 and the housing 502 as including two protuberances 518 and two slots 520, respectively, it should be apparent that more or less protuberances and/or slots can be employed without departing from the scope of the disclosure. For example, the pipe 508 may include one protuberance, three protuberances, four protuberances, etc. and/or the housing 502 may include one slot, three slots, five slots, etc. In such examples, the protuberances 518 may be spaced apart more or less than 180 degrees and/or the slots may be spaced apart more or less than 180 degrees.

As shown in FIGS. 6, 9 and 10, the valve 500 includes an optional gasket 522 positioned between the pipe 508 and the housing 502. Specifically, the gasket 522 is positioned about the body portion 510 of the pipe 508. The gasket 522 can provide a seal between the pipe 508 and the housing 502 to prevent fluid leaks.

The gasket 522 can be formed of any suitable material such as rubber, silicone, cork, plastic, etc. In the particular example of FIGS. 5-10, the gasket 522 is a rubber gasket. Additionally, the gasket 522 may have any suitable size and/or shape depending on the size and/or shape of the pipe 508 and the housing 502.

As shown in FIG. 10, the gasket 522 defines an aperture 524 that is aligned with the pipe aperture 112. The aperture 524 allows fluid to pass through the gasket 522 when the pipe 508 is rotated into a particular position, as explained above.

The gasket 522 and/or another suitable gasket may be employed in any of the other valves disclosed herein.

The components (e.g., the pipe, the housing, the fastener, etc.) of the valves disclosed herein may include any suitable size and/or shape depending on, for example, the desired pressure level at the output, the desired amount of fluid at the output, etc. For example, the pipes and/or the housings disclosed herein may have a substantially circular cross-sectional shape (as shown), and/or another suitable shape such as elliptical, rectangular, triangular, etc. Additionally, the pipes may have an inner diameter of about ⅜" and the housings may have an inner diameter of about ⅘". In other examples, the pipes' inner diameter may be more or less than ⅜" and the housings' inner diameter may be more or less than ⅘". Further, the fasteners disclosed herein may include any suitable spring having a spring constant that can bias the pipe against the housing when the pipe is inserted into the housing.

Additionally, the pipes, the housings and/or the fasteners may be formed of any suitable material. For example, the pipes, the housings, and/or the fasteners may be formed of a metallic material (e.g., copper, etc.), a plastic material (e.g., polyvinyl chloride (PVC), polyethylene such as a cross-linked polyethylene, etc.), etc.

Further, and as used herein, fluid includes substances that have no fixed shape such as liquids, gases, etc. For example, the fluid can include water (e.g., clean water, waste water, etc.), gasoline, oil, air, nitrogen, natural gas, etc.

The fluid sources disclosed herein may be one or more pipes, reservoirs and/or other suitable fluid sources upstream of the valves. For example, the fluid sources may include a municipality's water source, a pipe entering a building (e.g., a house, an apartment building, office building, etc.), etc.

The outputs disclosed herein may be one or more pipes, fixtures and/or other suitable outputs downstream of the valves. For example, the outputs may include fixtures utilizing liquid (e.g., sink faucets, toilets, washing machines, etc.), fixtures utilizing gas (e.g., hot water heaters, stoves, outdoor grilling stations, etc.), etc. The outputs may be located in a building or outside a building.

Additionally, any one of the valves disclosed herein may be coupled on an interior side of a finished wall in a building. In other words, the valve can be coupled inside the finished wall (e.g., behind drywall, etc.). In such examples, the pipe (e.g., the pipe 108, etc.) of the valve may be accessible from an exterior side of the finished wall. For example, the valve's pipe may extend from behind the finished wall to the opposing side (e.g., the exterior side) of the finished wall to allow a user to manipulate (e.g., rotate, pull, etc.) the pipe as explained above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve assembly for controlling the passage of fluid between a fluid source and an output, the valve assembly comprising:

a housing defining a channel and an aperture, the housing including an inlet configured to receive fluid from a fluid source via the aperture and an inner surface defining at least two slots;

a pipe insertable in the housing, the pipe defining a channel and an aperture in fluid communication with the channel of the pipe, the pipe including an outer surface, at least two protuberances extending from the outer surface, and an outlet separated from and in fluid communication with the pipe's aperture via the pipe's channel, the outlet configured to couple to an output for receiving fluid from the fluid source via the pipe's channel, the pipe rotatable within the housing between a first position in which the housing's aperture is blocked by the pipe to restrict fluid from entering the pipe's channel from the fluid source through the housing's aperture, and a second position in which the pipe's aperture is substantially aligned with the housing's aperture to create a fluid path between the fluid source and the output via the pipe's channel, the inner surface of the housing adjacent the outer surface of the pipe when the pipe is inserted in the housing, and the at least two slots configured to receive the at least two protuberances to retain the pipe in one of the first position and the second position; and a fastener configured to couple to the housing and the pipe and allow rotation of the pipe between the first position and the second position, the fastener including a spring configured to bias the pipe in a longitudinal direction inside the housing in one of the first position and the second position.

2. The valve assembly of claim 1 further comprising a gasket positioned between the pipe and the housing, the gasket defining an aperture aligned with the aperture of the pipe.

3. The valve assembly of claim 2 wherein the fastener includes a detachable fastener.

4. The valve assembly of claim 3 wherein the two protuberances are spaced about 180 degrees apart.

5. A system including the valve assembly of claim 4 and at least one pipe coupling the valve assembly to a fluid source, the valve assembly coupled on an interior side of a finished wall in a building with the pipe of the valve assembly accessible from an exterior side of the finished wall.

6. The valve assembly of claim 3 wherein the pipe is moveable in the longitudinal direction to release the at least two protuberances from the at least two slots.

7. A system including the valve assembly of claim 6 and at least one pipe coupling the valve assembly to a fluid source, the valve assembly coupled on an interior side of a finished wall in a building with the pipe of the valve assembly accessible from an exterior side of the finished wall.

8. The valve assembly of claim 1 wherein the fastener includes a detachable fastener.

9. The valve assembly of claim 8 wherein the fastener includes threads, wherein the pipe includes threads corresponding to the threads of the fastener, and wherein the fastener is configured to threadedly couple to the pipe.

10. The valve assembly of claim 1 wherein the two protuberances are spaced about 180 degrees apart.

11. The valve assembly of claim 1 wherein one of the two slots represents the first position and wherein another one of the two slots represents the second position.

12. The valve assembly of claim 1 wherein the pipe is moveable in the longitudinal direction to release the at least two protuberances from the at least two slots and rotatable to align the at least two protuberances and the at least two slots.

13. A system including the valve assembly of claim 1 and at least one pipe coupling the valve assembly to a fluid source, the valve assembly coupled on an interior side of a finished wall in a building with the pipe of the valve assembly accessible from an exterior side of the finished wall.

14. The valve assembly of claim 1 wherein the pipe is moveable in the longitudinal direction to release the at least two protuberances from the at least two slots and rotatable to align the at least two protuberances and the at least two slots.

15. A method of controlling the passage of fluid between a fluid source and an output with a valve including a housing, a pipe insertable in the housing, and a fastener configured to couple to the housing and the pipe and allow rotation of the pipe between a first position and a second position, the fastener including a spring configured to bias the pipe in a longitudinal direction inside the housing in one of the first position and the second position and to restrict removal of the pipe from the housing, the housing defining a channel and an aperture the housing including an inner surface defining at least two slots, and the pipe including an outer surface and at least two protuberances extending from the outer surface, the pipe defining a channel and an aperture, the method comprising: moving at least a portion of the pipe out of the housing against the bias of the spring; and rotating the pipe within the housing between the first position in which the housing's aperture is blocked by the pipe to restrict fluid from entering the pipe's channel from the fluid source through the housing's aperture, and the second position in which the pipe's aperture is substantially aligned with the housing's aperture to create a fluid path between the fluid source and the output via the pipe's channel, the inner surface of the housing adjacent the outer surface of the pipe when the pipe is inserted in the housing, and the at least two slots configured to receive the at least two protuberances to retain the pipe in one of the first position and the second position.

16. The method of claim 14 wherein moving the at least a portion of the pipe out of the housing includes pulling the at least a portion of the pipe out of the housing.

17. The method of claim 15 wherein rotating the pipe includes rotating the pipe about 180 degrees between the first position and the second position.

18. The method of claim 15 wherein rotating the pipe includes rotating the pipe by hand.

19. The method of claim 18 wherein rotating the pipe includes rotating the pipe when the housing is coupled to the fluid source.

20. The method of claim 19 wherein rotating the pipe includes rotating the pipe when fluid is present in at least a portion of the housing.

* * * * *

UNITED STATES PATENT AND TRADEMARK OFFICE
CERTIFICATE OF CORRECTION

PATENT NO. : 10,309,540 B2
APPLICATION NO. : 15/284237
DATED : June 4, 2019
INVENTOR(S) : John M. Eise

Page 1 of 1

It is certified that error appears in the above-identified patent and that said Letters Patent is hereby corrected as shown below:

In the Claims

Claim 16, Column 12, Line number 14, replace "14" with --15--

Signed and Sealed this
Third Day of September, 2019

Andrei Iancu
*Director of the United States Patent and Trademark Office*